United States Patent [19]
Tomita et al.

[11] 3,891,475
[45] June 24, 1975

[54] POLE PIECE FOR PRODUCING A UNIFORM MAGNETIC FIELD

[75] Inventors: Sadami Tomita, Katsuta; Akio Chiba, Hitachi; Goh Miyajima, Katsuta, all of Japan

[73] Assignee: Hitachi, Ltd., Japan

[22] Filed: Apr. 25, 1973

[21] Appl. No.: 354,467

[30] Foreign Application Priority Data
Apr. 26, 1972 Japan.............................. 47-41328

[52] U.S. Cl............. 148/31.55; 75/123 K; 75/170; 75/171; 148/121
[51] Int. Cl............................................ C04b 35/00
[58] Field of Search.................. 75/170, 123 K, 171; 148/31.55, 120, 121, 31.57, 103

[56] References Cited
UNITED STATES PATENTS

| | | | |
|---|---|---|---|
| 2,111,005 | 3/1938 | Remmers | 148/31.57 |
| 2,442,219 | 5/1948 | Stanley | 75/123 K |
| 3,148,092 | 9/1964 | Shull | 148/103 |
| 3,166,408 | 1/1965 | Chen | 75/123 K |
| 3,597,286 | 8/1971 | Thornburg | 148/121 |
| 3,622,409 | 11/1971 | McCumm | 148/122 |
| 3,695,944 | 10/1972 | Stroble | 148/31.55 |

Primary Examiner—Walter R. Satterfield
Attorney, Agent, or Firm—Craig & Antonelli

[57] ABSTRACT

A strong and uniform magnetic field is required at the magnetic gap of magnetic circuits in an analyzing apparatus such as a nuclear magnetic resonance apparatus. The addition of 0.15–0.5 percent carbon to a 35–55 percent co-containing iron-cobalt soft magnetic alloy which is used as a pole piece incorporated into the circuits can result in fine crystal structures without the strong magnetic performance harmed, so that a strong and uniform magnetic field is obtained.

6 Claims, 9 Drawing Figures

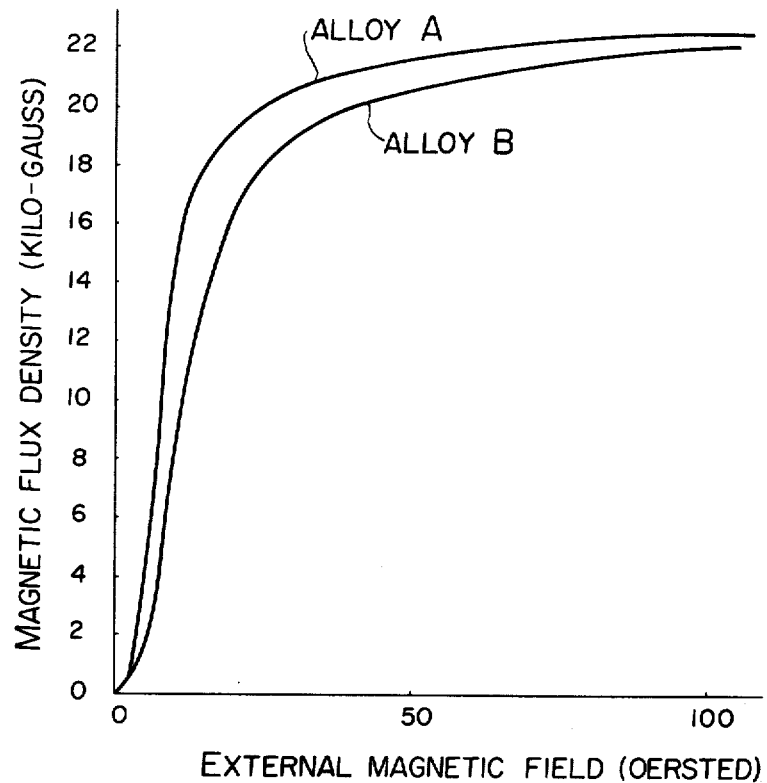

(40 TIMES)

(40 TIMES)

(40 TIMES)

(40 TIMES)

(40 TIMES)

SURFACE MAGNETIZATION

SWEEPING MAGNETIC FIELD

POLE PIECE FOR PRODUCING A UNIFORM MAGNETIC FIELD

BACKGROUND OF THE INVENTION

The present invention relates to a soft magnetic alloy and, particularly, a soft magnetic alloy for a pole piece in magnetic circuits in an analyzing apparatus utilizing magnetic field such as a nuclear magnetic resonance apparatus, an electron-probe X-ray microanalyser, an electron microscope or a mass spectrometer.

A strong magnetic field having thousands to tens of thousands of oersteds is required by an analyzing apparatus such as a nuclear magnetic resonance apparatus in order to subject atoms, nuclei and often charged particles to polarization in the magnetic field. Therefore, materials used for a yoke or a pole piece for introducing magnetic flux from a magnetic field generating source such as a permanent magnet or an electromagnet into a sample to be examined by the analytical apparatus require a high saturation magnetic flux density. As the materials a soft magnetic alloy such as pure iron, an iron-nickel alloy or an iron-cobalt alloy is often used.

Since the iron-cobalt alloy of said soft magnetic alloys has a saturation magnetic flux density of above 20,000 gauss, it is useful as a material for magnetic circuits, particularly pole pieces. A magnetic flux in magnetic circuits is allowed to converge at pole pieces and thus a strong magnetic field is given to a test sample placed in a magnetic gap between the pole pieces. Therefore, a material for pole pieces requires a high saturation magnetic flux density. A soft magnetic alloy which contains 35 to 55 percent by weight of cobalt, the balance being iron is generally utilized as a material for magnetic circuits requiring a high magnetic flux density, because it has a saturation magnetic flux density of above 22,000 gauss (when an external magnetic field of 100 oersted is applied).

As mentioned above, the requirements of pole piece materials used by an analyzing apparatus utilizing a magnetic field are that a saturation magnetic flux density is high and further the magnetic field has good uniformity.

In an analyzing apparatus, for example, a pair of permanent magnets, i.e., a magnetic field generating source are opposed and at the end each of the magnets a pole piece made of the soft magnetic alloy is supported. A test sample is placed in the magnetic field between the pole pieces and various properties are determined. For example, when nuclear magnetic resonance spectra is determined, the nuclear spin of a test sample is polarized under a magnetic field. The polarized nuclear spin leads to the precession at a frequency defined by the following equation.

$$2\pi f = \gamma H$$

wherein $f$ is the frequency of the precession, $H$ is the strength of static magnetic field, and $\gamma$ is an angular momentum ratio, i.e., a constant which is dependent upon a kind of nucleus.

When a high frequency magnetic field is applied in a direction perpendicular to the static magnetic field from said magnetic field generating source, the correspondence of the frequency of said high frequency magnetic field with that of said precession derives resonance between the high frequency magnetic field and the nuclear spin. The resonance is detected by a detecting circuit in a high frequency oscillator. In order to precisely determine the nuclear spin resonance the intensity ($H$) of the static magnetic field is required to be uniform, because when the static magnetic field is non-uniform the intensity ($H$) thereof is different at each part of a test sample and, therefore, the test sample has no constant precession frequency, that is, only a part of the test sample which is provided with a strength of static magnetic field corresponding to a frequency of high frequency magnetic field generates the resonance.

The nuclear magnetic resonance apparatus may be used for the identification of organic compounds. Since an atom in the organic compounds, e.g., a hydrogen atom interacts with another hydrogen atom or other adjacent atoms, an angular momentum ratio $\gamma$ appears to shift slightly from a constant value (in the case of an atomic nucleus of hydrogen $\gamma = 2\pi \times 4.2578$ kHz/oersted). This is referred to as the chemical shift. When the nuclear spin resonance spectrum of atomic nuclei which chemically shift is determined the resonance is allowed to occur at a constant frequency by adding a relatively small saw-wave magnetic field $\Delta H$ to a static magnetic field $H$.

When the static magnetic field initially applied is not uniform, the same kinds of nuclei at correspondent sites of test samples, i.e., organic compounds, are different in a intensity ($H$) of static magnetic field applied to these nuclei from each other. Therefore, a resonance requires a corresponding saw-wave magnetic field $\Delta H$. As a result, the nuclear spin resonance spectrum will expand. To the contrary, the uniformity of magnetic field between pole pieces in a nuclear magnetic resonance apparatus makes the resonance spectrum sharp and improve the analyzing power of said apparatus. Thus, the nuclear magnetic resonance apparatus needs the uniformity of magnetic field between pole pieces.

In the case of another analyzing apparatus utilizing a magnetic field, i.e., a mass-spectrometer, charged particles are caused to curve in their directions of movement by force which is in proportion to the strength of the magnetic field and applied in a direction field and applied in a direction perpendicular to the magnetic flux between pole pieces, when they pass through a magnetic gap between the pole pieces. Since non-uniformity of an intensity of magnetic field thus varies the angle at which charged particles curve, then the capability of a mass-spectrometer to separate the charged particles by means of a ratio of electric charge amount 1 mass of them will not be displayed.

As seen from the above, the uniformity of magnetic field is a factor important for an analyzing apparatus utilizing the magnetic field. Various efforts have been made to improve the uniformity.

On the other hand, from an aspect of the crystal structure of an iron-cobalt alloy it is known that said alloy is not suitable in its magnetic uniformity. That is, said alloy is apt to be non-uniform in its structure because $\alpha$ crystal grains non-uniformly precipitate on the phase transformation when said alloy is solidified. The magnetic uniformity of the iron-cobalt alloy material is dependent upon a method for preparing it. When a thin sheet such as a troidal core or a laminated core is used the material is prepared by cold rolling and, therefore, the selection of the operating conditions in the subsequent annealing treatment results in obtaining five and uniform recrystallization structure. When a thin sheet is thus used a material having good magnetic uniformity is possible to obtain. However, a bulky shape of a pole piece is required by an analyzing apparatus which needs good magnetic uniformity and impossible to homogenize by the annealing for homogenization after the cold working. The iron-cobalt alloy is brittle and very difficult to forge: For the purpose of improving this workability an element of Group IV or V of the Periodic Table such as vanadium has been added to said alloy in an amount of 0.5 to 2 percent by weight. This is detailedly described in U.S. Pat. No. 3,148,092 or Japanese Pat. No. 20,646/64. However, these merely refer to the workability of the iron-cobalt alloy and do not suggest to make the crystal grain structure of said alloy fine and to improve the magnetic uniformity of said alloy.

When a thick steel or a bulky shape of the iron-cobalt soft magnetic alloy is prepared, ingots are firstly made by melting, and then hot forged or hot rolled. If such hot working operation is not carried out at a temperature above the order-disorder transformation temperature, i.e., above 750°C., the brittleness of said alloy prevents hot working.

Thus, the preparation of such a thick sheet or a bulky shape is subject to the restiction mentioned above. That is, the hot forging or hot rolling must be carried out at a sufficiently high temperature. The prior bulky shape of the iron-cobalt alloy thus prepared is still unsuitable as a pole piece having the magnetic uniformity.

SUMMARY OF THE INVENTION

The object of the present invention is to provide an iron-cobalt soft magnetic alloy having a fine crystal grain structure and improved magnetic uniformity.

According to the present invention, a particular amount of carbon is added to a soft magnetic alloy consisting mainly of iron and cobalt and having a high saturation magnetic flux density to make the crystal grain structure of the alloy finer and improve the magnetic uniformity of the alloy as a pole piece material.

Another object of the present invention is to provide a bulky shape of an iron-cobalt alloy as a pole piece material which is provided with a fine crystal grain structure without being cold worked, and improved in a magnetic uniformity.

Still another object of the present invention is to improve the magnetic uniformity in a magnetic gap by using the magnetic alloy according to the present invention as a pole piece of a magnetic circuit and thus to improve the resolution of an analyzing apparatus utilizing a magnetic field.

DESCRIPTION OF PREFERRED EMBODIMENTS

Figure 1B:
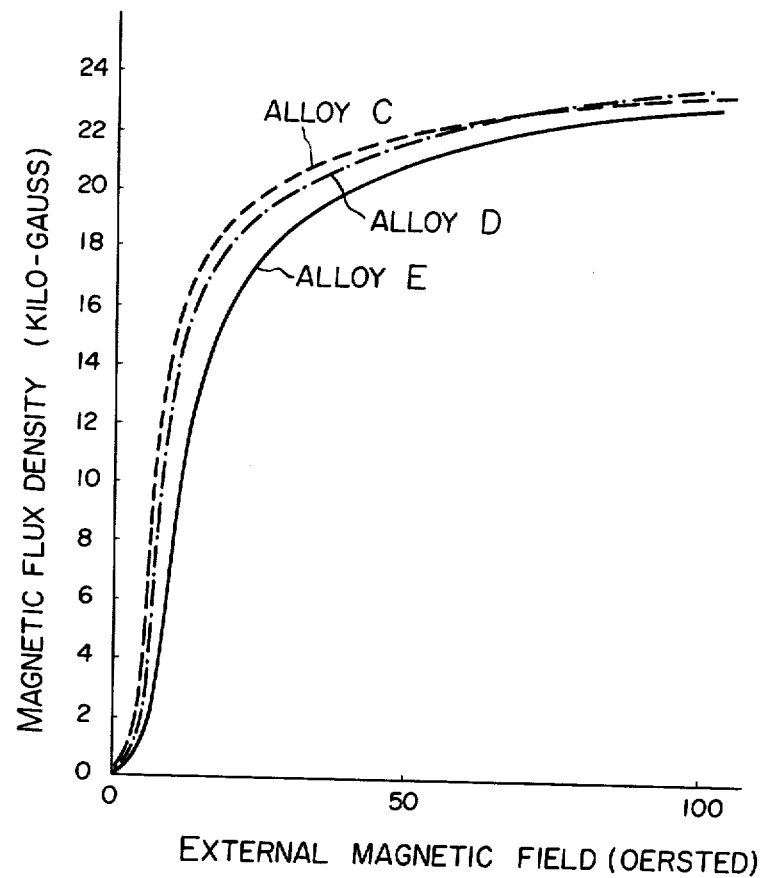
FIG. 1(a) and (b) of the attached drawings illustrates graphically the relationship of a magnetic flux density to an external magnetic field to show the magnetic properties of a prior alloy and the alloy according to the present invention.

As already mentioned, magnetic flux from magnetic force generating sources such as permanent magnets or electromagnets is allowed to converge by pole pieces provided at ends of these magnetic field generating sources and acts on a specimen placed in a magnetic gap between said pole pieces. The importance of the uniformity of magnetic flux acting on a specimen is well appreciated in an analyzing apparatus. The uniformity of magnetic flux in a magnetic gap is adversely affected by inclusions of non-metallic materials in pole pieces, boundaries of crystal grains and residual strain.

The contents of inclusions of non-metallic materials can be lowered by the preparation of pole pieces under vacuum or in an inert gas. However, such preparation causes the coarseness of crystal grain structure and the distortion of magnetic flux.

The annealing for homogenization is carried out to eliminate internal residual strain. Therefore, good workability, e.g., in hot forging is required.

The phase transformation of an iron-cobalt alloy occurs in the following manner. The melt of the alloy solidifies at about 1,180°C. Then, $\gamma$ crystal grains firstly precipitate. Subsequently, it is normally cooled to maintain the crystal lattice of a face-centered cubic form up to about 900°C. This range is referred to as $\gamma$-area. There are both face-centered and body-centered cubic lattices within a temperature range from about 900°C. to about 800°C. This range is referred to as $\gamma + \alpha$-area. There are only body-centered cubic lattices within a temperature range from about 800° to about 730°C. This range is referred to as $\alpha$-area. Part of these body-centered cubic crystals is ordered in lattice at a temperature below 730°C. This range is referred to as $\alpha + \alpha'$-area. The $\alpha + \alpha'$ phase affects the magnetic uniformity. This is caused by a large $\alpha$ crystal grain size and the localization of the $\alpha'$ phase having ordered lattice in the $\alpha + \alpha'$ phase.

As the alloy is cooled from the $\gamma$-area to the $\alpha$-area, $\alpha$ crystal grains are initially formed at boundaries of $\gamma$ crystal grains. As a temperature is further decreased $\alpha$ crystal grains are formed also inside the $\gamma$ crystal grains. Internal strain is generated by a change of volume from the $\alpha - \gamma$.transformation. $\alpha$ crystal grains formed later, i.e., during the $\alpha - \gamma$ transformation have greater internal strain than that of $\alpha$-crystal grains formed at the initial stage. $\alpha$ crystal grains having greater internal strain rapidly grow in the $\alpha + \alpha'$ area. To the contrary, $\alpha$crystal grains having smaller internal strain slowly grow and are slowly ordered. For this reason, when a molten metal is solidified the precipitations of $\gamma$ crystal grains and of $\alpha$ crystal grains from the $\gamma$ crystal phase must be controlled. Otherwise coarse $\alpha$ crystal grains cannot be prevented from being formed and also an $\alpha'$ phase cannot be prevented from being localized in an $\alpha + \alpha'$ phase.

According to the present invention, it has been found that an effective process of preventing $\alpha$ crystal grains from being coarse and an $\alpha'$ phase from being formed in an $\alpha + \alpha'$ phase is to add a proper amount, i.e., 0.15 to 0.5 percent by weight, of carbon to a molten iron-cobalt alloy which may or may not contain some percentages of additives such as vanadium, titanium, chromium or niobium, whereby an iron-cobalt soft magnetic alloy having the magnetic uniformity conspicuously improved can be obtained.

The various cobalt contents of the iron-cobalt soft magnetic alloy has heretofore been proposed. 35 to 55 percent by weight of cobalt is sufficient to obtain a saturation magnetic flux density of 20,000 gauss. 40 to 48 by weight of cobalt is particularly preferred.

Further, a small amount of vanadium, titanium, chromium or niobium is generally added to the alloy to improve the workability thereof, but the addition of greater amounts of these additives causes magnetic properties to be deteriorated and adversely affects the workability of the alloy. Therefore, the total content of these additives or even the content of each additive should not exceed 3 percent by weight of the alloy. Preferably, vanadium is contained in the alloy in an amount of 2 to 3 percent by weight.

Vanadium and manganese are generally believed effective to make a crystal grain size smaller. However, as seen from Example 2, the addition of these additives to the alloy of the present invention is not effective. Even if these additives are added to the iron-cobalt alloy, crystal grains are not made fine if carbon is not added in a proper amount. The addition of manganese in an amount of up to 1 percent by weight does not harm the advantages of the present invention.

Further, since a minor amount of oxygen contained in a metal to be molten and oxygen dissolved into a molten metal from an atmosphere adversely affect the magnetic properties and workability of the resulting alloy, the oxygen may be fixed with a small amount of manganese to settle the molten metal. When sulfur is incorporated into the molten metal, it may be also fixed with manganese in manganese sulfide.

Furthermore, the resulting oxide and sulfide function as crystal seeds during the solidification of the molten metal. Therefore, they aid to make crystal grains fine together with carbon. The addition of manganese in an amount below 1 percent is effective to a practical alloy. Preferably, manganese is added in an amount of 0.1 to 1 percent by weight.

The presence of impurities in the alloy of the present invention adversely affects the magnetic properties and workability of said alloy and introduces non-metallic inclusions into said alloy. Therefore, less amounts of the impurities are desirable. However, silicon, aluminum, sulfur, phosphorous, etc., are incorporated from raw materials or a furnace into the alloy. Up to 0.2 percent by weight of silicon and aluminum and up to 0.03 percent by weight of sulfur and phosphorous are permissible as incidental impurities which do not adversely affect the properties of the alloy.

EXAMPLE 1

Pure iron, metallic cobalt and metallic vanadium are molten together in an atmosphere of an inert gas (argon), and then to the resulting molten alloys there are added various amounts of white pig iron with a carbon content of 3.65 percent by weight, so that various amounts of carbon are allowed to be contained in the alloys. The chemical analysis of the iron-cobalt alloys thus prepared are reported in Table 1. These alloys are cast in ingots. These ingots are heated to a temperature of 900° to 1100°C. and forged at a forging ratio of 5. Thereafter, ring-shaped test samples for the microscopic examination of crystal grain structure and for the measurement of magnetic properties are taken from the ingots. These test samples are annealed at 800°C for 3 hours. The annealed samples are subjected to the microscopic examination of crystal grain structure and the measurement of magnetic properties.

The results are reported in Table 2. The crystal grain size is represented in terms of the Ferrite Grain Size Number in accordance with the method prescribed by the Japanese Industrial Standard (G 0552). This Number corresponds to number of crystal particles counted within a certain range of a telescope. According to this representation method, the greater the Number, the smaller a crystal grain size is. Further, the magnetic properties are represented in terms of a magnetic flux density at 100 oersted of a strength of an external magnetic field.

As seen from Tables 1 and 2, an alloy containing more than 0.5 percent by weight of carbon has a smaller crystal grain size, and this means that the uniformity of magnetic field is improved.

Further, as a carbon content is increased, magnetic properties become lowered. With Sample No. 8 containing 0.60 percent by weight of carbon, the magnetic flux density at 100 oersted of an intensity of an external magnetic field is lowered below 20,000 gauss.

Table 1

Chemical Analysis of Iron-Cobalt Alloys (% by weight)

| Sample No. | C | Si | Al | V | Co | Fe |
|---|---|---|---|---|---|---|
| 1 | 0.018 | 0.02 | 0.03 | 2.63 | 47.2 | remainder |
| 2 | 0.12 | 0.02 | 0.04 | 2.65 | 47.3 | '' |
| 3 | 0.15 | 0.02 | 0.04 | 2.68 | 47.2 | '' |
| 4 | 0.20 | 0.03 | 0.03 | 2.57 | 47.3 | '' |
| 5 | 0.31 | 0.02 | 0.04 | 2.65 | 47.3 | '' |
| 6 | 0.42 | 0.02 | 0.04 | 2.54 | 47.4 | '' |
| 7 | 0.50 | 0.03 | 0.03 | 2.59 | 47.3 | '' |
| 8 | 0.60 | 0.03 | 0.04 | 2.68 | 47.3 | '' |
| 9 | 0.80 | 0.02 | 0.04 | 2.60 | 47.4 | '' |
| 10 | 1.03 | 0.02 | 0.04 | 2.60 | 47.4 | '' |

Table 2

Crystal Grain Size and Magnetic Properties

| Sample No. | Crystal grain size | Magnetic properties (gauss) |
|---|---|---|
| 1 | 3.4 | 21,300 gauss |
| 2 | 4.1 | 20,900 |
| 3 | 6.2 | 20,800 |
| 4 | 6.2 | 20,700 |
| 5 | 6.5 | 20,500 |
| 6 | 6.7 | 20,400 |
| 7 | 6.8 | 20,400 |
| 8 | 7.1 | 19,500 |
| 9 | 7.5 | 19,400 |
| 10 | 7.3 | 19,100 |

EXAMPLE 2

Iron-cobalt-manganese alloys having vanadium or titanium and carbon added thereto are prepared by melting in an atmosphere of argon. The used raw materials are highly pure metallic cobalt roasted and then reduced with wet hydrogen, pure iron reduced with wet hydrogen, metallic vanadium, metallic titanium and electrolyzed manganese. Carbon is added in the form of white pig iron with a carbon content of 3.65 percent by weight. The iron-cobalt-manganese alloys are cast in ingots. The chemical analysis of the resulting ingots are reported in Table 3.

Table 3

| Ingot No. | Chemical Analysis of Ingots | | | | | | | | | |
|---|---|---|---|---|---|---|---|---|---|---|
| | C | Si | Mn | Al | V | Ti | S | P | Co | Fe |
| A | 0.008 | 0.03 | 0.46 | 0.02 | 2.36 | — | 0.007 | 0.004 | 45.3 | remainder |
| B | 0.221 | 0.02 | 0.59 | 0.05 | 2.15 | — | 0.004 | 0.002 | 43.6 | '' |
| C | 0.003 | 0.04 | 0.84 | 0.02 | — | trace | 0.003 | 0.006 | 40.8 | '' |
| D | 0.003 | 0.03 | 0.77 | 0.02 | — | 0.24 | 0.002 | 0.005 | 40.3 | '' |
| E | 0.231 | 0.03 | 0.80 | 0.05 | — | 0.25 | 0.002 | 0.005 | 40.4 | '' |

These ingots are scalped and then forged at a temperature of 900° to 1,100°C. at a forging ratio of 5. Thereafter the forged ingots are cooled in air to room temperature. From the alloy materials thus prepared ring-shaped test samples for the microscopic examination and for the measurement of magnetic properties are taken, and pole pieces of 200 mm. in diameter and 20 mm in thickness are prepared. The test samples and pole pieces are annealed at 800°C for 3 hours, and subjected to the microscopic examination and the measurement of magnetic properties and magnetic flux density in magnetic gap.

Figure 2A:
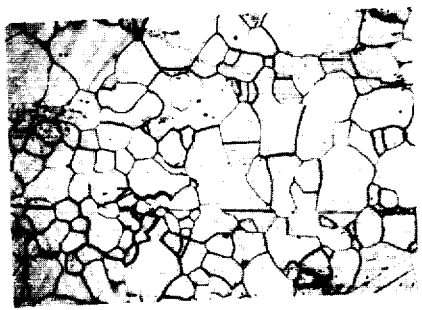
FIG. 2(a)–(e) are microphotographs (40 times) of test pole pieces made of the alloy according to the present invention.
Figure 2B:
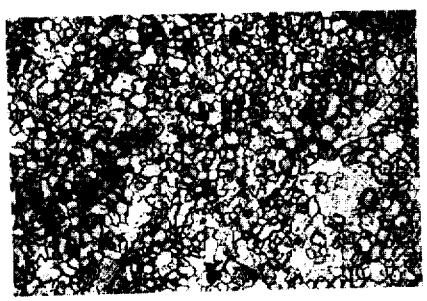
Figure 2C:
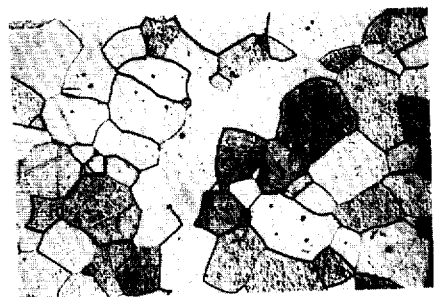
Figure 2D:
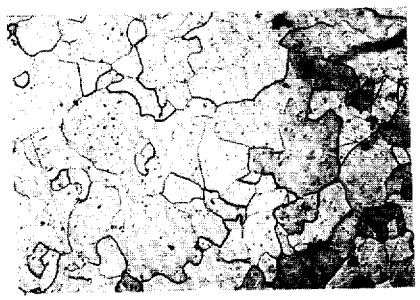
Figure 2E:
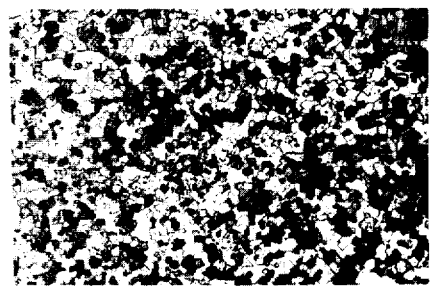

The magnetic properties (i.e., magnetization curves) are shown in FIG. 1. Ingots B and E have somewhat lower saturation magnetic flux densities than those of ingots A, C and D, but much higher saturation magnetic flux densities than those of other magnetic materials such as iron and, therefore, are suitable for pole piece materials generating a strong magnetic field. The microstructures of ingots A, B, C, D and E are shown in microphotographs ( × 40) in FIG. 2(a), (b), (c), (d) and (e), respectively. Ingots Nos. B and E are found to have much finer and more uniform crystal structures than those of ingots A, C and D.

Pole pieces 2 having the composition of ingot A or B are set face to face at the ends of permanent magnets 1 and are spaced. And a magnetic field having an intensity of 20,000 gauss is generated in the space between these pole pieces. The magnetic flux density distribution on the pole pieces is determined by running a detector along a surface of the pole pieces. The detector is Hall element detector having a microprove of 0.5 mm. in diameter of detection effective area.

Figure 3:
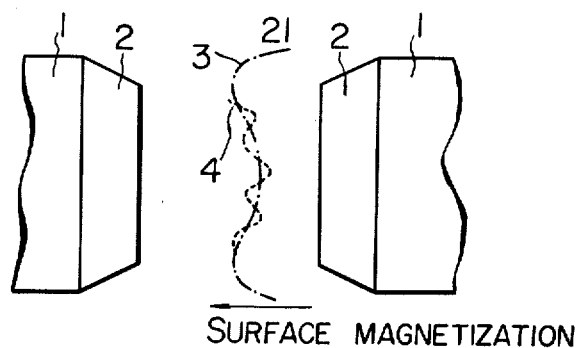
FIG. 3 illustrates part of a magnetic circuit using a pole piece made of the alloy according to the present invention.

The magnetic flux density is higher at edge portion 21 and lower at the center, as seen from alternate long and short dash line 3 shown in FIG. 3. Since area in an analyzing apparatus in which the problem of the magnetic uniformity is encountered is as very small as occupied by a test sample, the magnetic flux density distribution is detailedly determined. As a result, it has been found that alternate long and short dash line 3 showing a magnetic flux density distribution fluctuates as shown by another broken line 4. This fluctuation affects the resolution of an analyzing apparatus. The determination of the magnetic flux density distributions as indicated by broken line 4 for pole pieces having compositions of ingots A and B, respectively has found that the pole pieces having the composition of ingot B are much reduced to about one-third in an amplitude of a minor change of the distribution and the about one-fifth in a cycle of the fluctuation of those having the composition of ingot A.

Further, with pole pieces having compositions of ingots, C, D and E their magnetic flux density distributions are determined. In this case, the used intensity of magnetic field is 22,000 gauss. The pole pieces having the composition of ingot E have been found to have much lower amplitude and cycle of fluctuations than those having the compositions of ingots C and D. That is, the formers were reduced to about one-fourth in an amplitude of a minor change of the distribution and to about one-fifth in a cycle of the fluctuations, of the latters.

The addition of a small amount of carbon to a vanadium or titanium-containing iron-cobalt alloy makes crystal grains fine and improves the magnetic uniformity of the alloy. This can be explained as follows. Firstly, vanadium or titanium combines with carbon to form carbides which are stable at an elevated temperature and function as crystal seeds when a molten metal is solidified, thereby making $\gamma$ crystal grains fine. This is also observed by the addition of carbon to an iron-cobalt alloy containing chromium or niobium as well as vanadium or titanium. Further, when neither vanadium nor titanium is contained in the alloy, the addition of carbon leads to the same effect, because cementite is formed in the alloy. Secondly, the addition of a small amount of carbon to an iron-cobalt alloy has the advantage of preventing the $\alpha - \gamma$ transformation. This is clear from the fact that the addition of 0.2 percent by weight of carbon to the iron-cobalt alloy lowers the $\gamma$ to $\alpha$ transformation point by 100°C. When the alloy is cooled from $\gamma$-area to $\alpha$-area, no primary $\alpha$ crystal grains occur at $\gamma$ crystal grain boundaries. Conclusively, the abnormal growth of $\alpha$ crystal grains does not occur which introduce great internal strain at $\alpha +$ $\alpha'$-area and appear in a carbon-free iron-cobalt alloy. In other words, a uniform $\alpha + \alpha'$ phase is obtained by the addition of carbon.

EXAMPLE 3

Pole pieces having the chemical analysis of ingots F and G as reported in Table 4 are incorporated into the circuit as shown in FIG. 3, as in Example 2. The magnetic flux density distribution is determined on the pole pieces at an intensity of a magnetic field of 20,000 gauss.

The pole-piece of ingot G having the increased carbon content was reduced to about one-seventh in an amplitude of a minor change of the distribution and to one-eighth in a cycle of fluctuations.

Table 4

| Alloy No. | Chemical Analysis of Ingots | | | | | | | |
|---|---|---|---|---|---|---|---|---|
| | C | Si | Mn | Al | S | P | Co | Fe |
| F | 0.016 | 0.02 | 0.01 | 0.03 | 0.004 | 0.002 | 45.8 | remainder |
| G | 0.23 | 0.02 | 0.02 | 0.05 | 0.003 | 0.003 | 45.7 | '' |

EXAMPLE 4

Pole pieces to be applied to each nuclear magnetic resonance apparatus of the same shape are prepared from iron-cobalt-vanadium-manganese alloys in ingots H, I and J having various carbon contents as reported in Table 5. This preparation of the pole pieces is effected by the following process. Ingots firstly provided by melting are heated to a temperature of 900° to 1,100°C. and forged in disks of 160 mm. in diameter and 25 mm. in thickness. These disks are then lathed in such pole pieces 2 as shown in FIG. 3. The surfaces of these pole pieces are finished by grinding and polishing to be 20 mm. thick. These pole pieces are annealed in an atmosphere of argon at 800°C for 2 hours. With these pole pieces the magnetic properties and the grain size are reported in Table 6.

Figure 4:
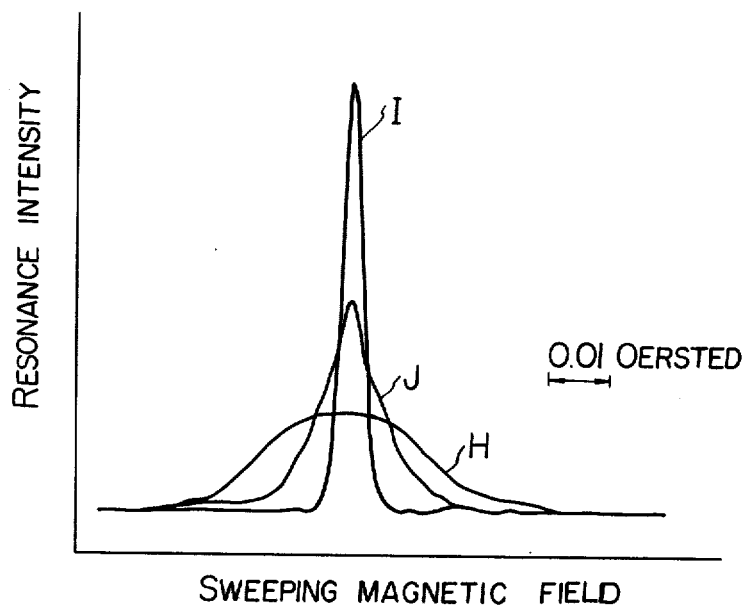
FIG. 4 illustrates graphically the results of determination of the nuclear spin resonance spectra of water which was made by using a nuclear magnetic resonance apparatus utilizing the pole pieces according to the present invention.

Two pole pieces prepared above are set face to face via air at the ends of permanent magnets of a magnetic field source in a nuclear magnetic resonance apparatus. A magnetic circuit is made so as to have a gap of only the space between the pole pieces by means of a yoke made of the soft magnetic alloy. The strength of magnetic field at this gap is adjusted to 14,092 oersted. Water as a sample placed in the center of this gap is subjected to a high frequency magnetic field of 60 MHz. The nuclear spin resonance spectra of hydrogen in the water is determined. FIG. 4 shows the results in the determination of the nuclear spin resonance spectra of hydrogen in water using the pole pieces having the chemical analysis as reported in Table 5. Symbols I, J and H in FIG. 4 correspond to those of ingots I, J and H, respectively, in Tables 5 and 6.

The resonance intensity of the spectrum determined by using the pole pieces having a carbon content of 0.30 percent by weight (ingot I) is the most sharp one of the three. The half value width was 0.0004 oersted. The uniformity of magnetic field is usually expressed by a ratio of half value width intensity of magnetic field. The uniformity is $3 \times 10^{-7}$ with the pole piece from ingot I and $2 \times 10^{-6}$ with that from ingot H (carbon content of 0.10 percent by weight). From the above it is found that pole pieces having a carbon content of 0.15 to 0.50 percent by weight are excellent in the uniformity of magnetic field.

Table 5

| Alloy No. | Chemical Analysis of Ingots | | | | | | | | |
|---|---|---|---|---|---|---|---|---|---|
| | C | Si | Mn | Al | V | S | P | Co | Fe |
| H | 0.10 | 0.02 | 0.51 | 0.04 | 2.53 | 0.005 | 0.002 | 47.1 | remainder |
| I | 0.30 | 0.03 | 0.48 | 0.04 | 2.51 | 0.004 | 0.003 | 47.2 | '' |
| J | 0.65 | 0.03 | 0.50 | 0.03 | 2.51 | 0.004 | 0.003 | 47.0 | '' |

Table 6

Crystal Grain Size and Magnetic Properties of Ingots used for Pole Pieces

| Alloy No. | Crystal grain size | Magnetic properties (gauss) |
|---|---|---|
| H | 4.5 | 20,300 gauss |
| I | 6.5 | 20,500 |
| J | 7.0 | 19,200 |

What is claimed is:

1. A pole piece for use in a magnetic circuit which comprises a soft magnetic alloy having a saturation magnetic flux density of at least 20,000 gauss when an external magnetic field of 100 oersted is applied and consisting essentially of 35 to 55 percent by weight of cobalt, 0.15 to 0.5 percent by weight of carbon, not more than 1 percent by weight of manganese, not more than 3 percent by weight of at least one of vanadium, titanium, chromium and niobium, not more than 0.2 percent by weight of silicon, not more than 0.2 percent by weight of aluminum, not more than 0.03 percent by weight of sulfur, not more than 0.03 percent by weight of phosphorus and the balance being substantially iron.

2. A pole piece according to claim 1, wherein the content of cobalt is 40 to 48 percent by weight and the content of carbon is 0.2 to 0.4 percent by weight.

3. A pole piece according to claim 2, wherein the content of manganese is 0.1 to 1 percent by weight.

4. A pole piece according to claim 3, wherein the content of vanadium is 2 to 3 percent by weight.

5. A pole piece according to claim 2, wherein the content of titanium is 0.1 to 0.5 percent by weight.

6. A pole piece according to claim 1, wherein the soft magnetic alloy has a fine crystal grain structure and a uniform $\alpha + \alpha'$ phase.

* * * * *